United States Patent [19]

Velie

[11] Patent Number: 4,651,711
[45] Date of Patent: Mar. 24, 1987

[54] FORCED AIR HEATER

[75] Inventor: Wally W. Velie, Ontario, Calif.

[73] Assignee: Scheu Manufacturing Company, Upland, Calif.

[21] Appl. No.: 765,513

[22] Filed: Aug. 14, 1985

[51] Int. Cl.$^4$ .............................................. F24H 3/02
[52] U.S. Cl. .............................. 126/110 C; 126/99 D; 126/110 B; 126/110 D; 126/116 A; 432/222; 431/171
[58] Field of Search ............. 126/99 D, 110 B, 110 C, 126/110 D, 116 A, 116 B; 432/222; 431/47, 171, 347, 350, 285, 263

[56] References Cited

U.S. PATENT DOCUMENTS

| | | | |
|---|---|---|---|
| 2,515,525 | 7/1950 | Modlin | 126/110 C |
| 3,055,145 | 9/1962 | Lindsay | 432/222 X |
| 3,077,920 | 2/1963 | Pavlak | 431/285 |
| 3,210,059 | 10/1965 | Nesbitt et al. | 432/222 |
| 3,267,929 | 8/1966 | Damon | 126/110 B |
| 3,399,024 | 8/1968 | Branson | 431/286 |
| 3,574,507 | 4/1971 | Kydd | 431/350 |
| 3,582,227 | 6/1975 | Velie et al. | 415/24 |
| 3,614,281 | 10/1971 | Ramey | 431/180 |
| 3,637,336 | 1/1972 | Velie et al. | 431/351 |
| 3,676,041 | 7/1972 | Mobus | 431/47 |
| 3,751,210 | 8/1973 | Babington et al. | 431/237 |
| 3,847,537 | 11/1974 | Velie | 431/347 |
| 3,909,188 | 9/1975 | Velie | 431/285 |
| 3,969,482 | 7/1976 | Velie | 47/2 |
| 4,086,053 | 4/1978 | Sommer, Jr. | 432/222 |
| 4,134,719 | 1/1979 | Velie | 431/171 |
| 4,244,349 | 1/1981 | Velie et al. | 126/110 C |
| 4,250,908 | 2/1981 | Velie | 137/7 |

FOREIGN PATENT DOCUMENTS 2921984 12/1980 Fed. Rep. of Germany ... 126/110 C

OTHER PUBLICATIONS

Brochure, National Riverside Co., "Instructions and Parts List for Model 60FA-BE", 9/84.

Primary Examiner—Samuel Scott
Assistant Examiner—Allen J. Flanigan
Attorney, Agent, or Firm—Fleit, Jacobson, Cohn & Price

[57] ABSTRACT

A forced air heater (10) includes a removable burner module (26) in which all of the burner components are mounted on a common support plate (42) to facilitate mounting of the burner module in the heater and removal of the burner module from the heater for servicing. An elongated burner tube (46) has a closed flattened end (50) receivable in a location-and-orienting bracket (76) to locate a single burner orifice (52) in a sidewall of the tube in proper position with respect to a pancake flame-spreader plate (78). A gas valve (44) and ignition device (58) also form part of the burner module 26. A combustion chamber (24) is of essentially box-shaped construction, with one open end (36), and includes an inclined baffle plate (40) which enhances mixing of combustion products and intake air in the chamber. A forced air blower (28) is mounted adjacent a heated air discharge opening (36b) of the combustion chamber (24). Intake air drawn into the combustion chamber (24) through openings (36a and 38) initially flows past a blower drive motor (96) to effect cooling of the motor when the heater is in operation.

8 Claims, 2 Drawing Figures

FORCED AIR HEATER

BACKGROUND OF THE INVENTION

1. Field of the Invention

This invention relates to a forced air heater, and more particularly to a forced air heater of the direct gas-fired, portable type which draws heated air produced by a removable burner module in a combustion chamber into a forced air blower and then exhausts the heated air into the space to be heated.

2. Description of the Prior Art

Numerous types of gas-fired forced air heaters have been developed and are known in the art. The most common type is typically tubular in shape, wherein a motor-driven fan pushes air through a burner combustion chamber and out of a heater exit, as disclosed in the U.S. Pat. No. 4,244,349 issued to W. W. Velie on Jan. 13, 1981. A less common type is of a box-shaped configuration, rather than tubular, wherein air is pulled, rather than pushed, through the combustion chamber. These latter units use a forced air blower, rather than a fan, because a blower incorporates a blower housing which isolates the blower motor from the hot gases produced in the combustion chamber. These latter style heaters have more specialized applications where such items as flame containment, low noise and/or better heat distribution are important. The development goal for such heaters is to optimize size, performance and cost. For example, a known heater of this type is manufactured by the National-Riverside Company, a Division of Scheu Products Company, Incorporated of Rancho Cucamonga, Calif., the assignee of the subject application, as their model 60FA-BE forced air propane gas portable heater. In this connection, the purpose of this invention is to provide an improved small forced air gas heater of this type which is lower in cost, easier to service, simpler in construction, and which provides more efficient cleaner combustion and more uniform circulation of heated air within the combustion chamber.

SUMMARY OF THE INVENTION

In general, a forced air heater in accordance with the invention comprises a combustion chamber mounted on a base plate and a forced air blower mechanism located adjacent the combustion chamber for drawing the heated air produced in the combustion chamber by a burner mechanism out of the combustion chamber and exhausting the heated air into the space to be heated. An important part of the invention is a removable burner module located in the combustion chamber for producing heated air in the combustion chamber. The burner module comprises an elongated burner tube having a single burner orifice.

More specifically, the single burner orifice of the elongated burner tube is located in a sidewall of the tube between open and closed ends of the tube, and faces toward a flat flame-spreader plate located between the orifice and the forced air blower mechanism. The closed end of the elongated burner tube is of a flattened configuration and is received in an inverted essentially channel shaped locating-and-orienting device for properly locating and orienting the tube with respect to the flame-spreader plate.

In addition to the elongated burner tube, the burner module includes an elongated support plate having a fuel flow control valve mounted thereon, an ignition device mounted thereon, which may be a spark electrode and/or a pilot light device connected to the fuel flow control valve, and with the elongated burner tube, spark electrode, pilot light device, a pilot light device windshield and a thermocouple device also being mounted on the elongated support member. The pilot light device shield may have a top wall, opposed sidewalls, and an end air deflector, such that the shield can straddle the pilot light device and provide effective windshielding thereof.

The combustion chamber may be of essentially box-shaped construction and have one essentially open end, a first portion of which defines an air intake opening and a second portion of which defines an air discharge opening. The forced air blower mechanism may include a housing having an air-intake opening on one side thereof and having a discharge opening, with a blower device mounted in the air-intake opening and located adjacent the second open end portion of the combustion chamber for drawing heated air into the blower housing and exhausting the heated air out of the blower discharge opening. The forced air blower mechanism may further include a drive motor mounted on an opposite side of the housing for driving the blower device. During a heating operation, the blower device draws relatively cool unheated air into the combustion chamber through the first open portion of the combustion chamber and into the combustion chamber for heating, with the cool unheated air being directed so that it initially flows past the drive motor and thereby simultaneously cools the motor when the heater is in operation.

DETAILED DESCRIPTION

Figure 1:
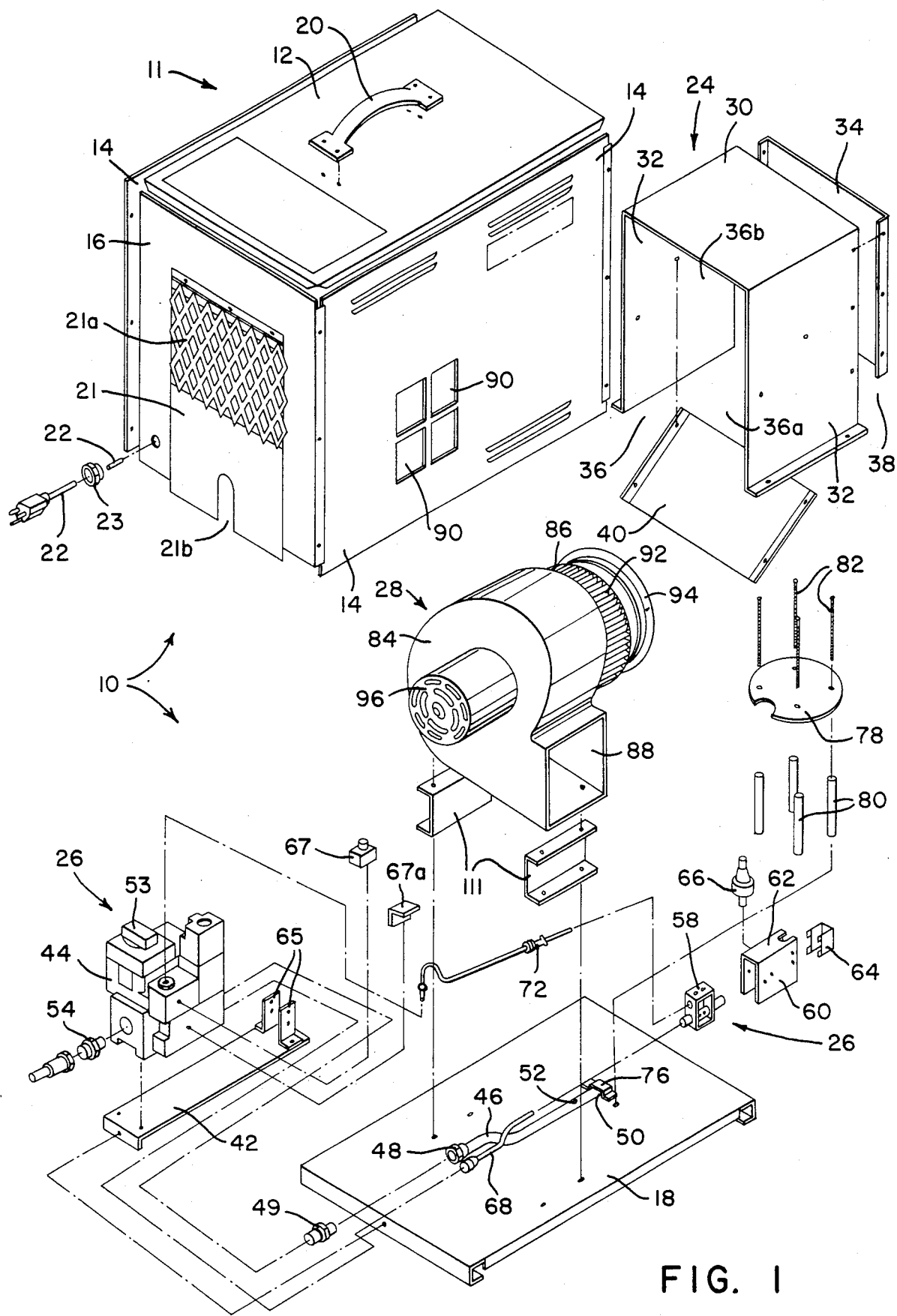
FIG. 1 is an isometric exploded view of a forced air heater in accordance with the invention.

In general, referring to the drawings, a forced air heater 10 in accordance with the invention includes an outer housing 11 having a top wall 12, sidewalls 14, front and rear end walls 16 and a base plate 18. The heater 10 is of a portable type and includes a carrying handle 20 provided on the top wall 12. A hinged access door 21, having an air inlet screen 21a secured thereon, is mounted on the front end wall 16, and a power cord 22 (FIG. 1) extends into the housing 11 through a strain relief bushing 23 mounted in the front end wall 16. The heater 10 further includes a combustion chamber 24, a burner module 26 and a forced air blower 28 mounted within the housing 11 on the base plate 18.

Figure 2:
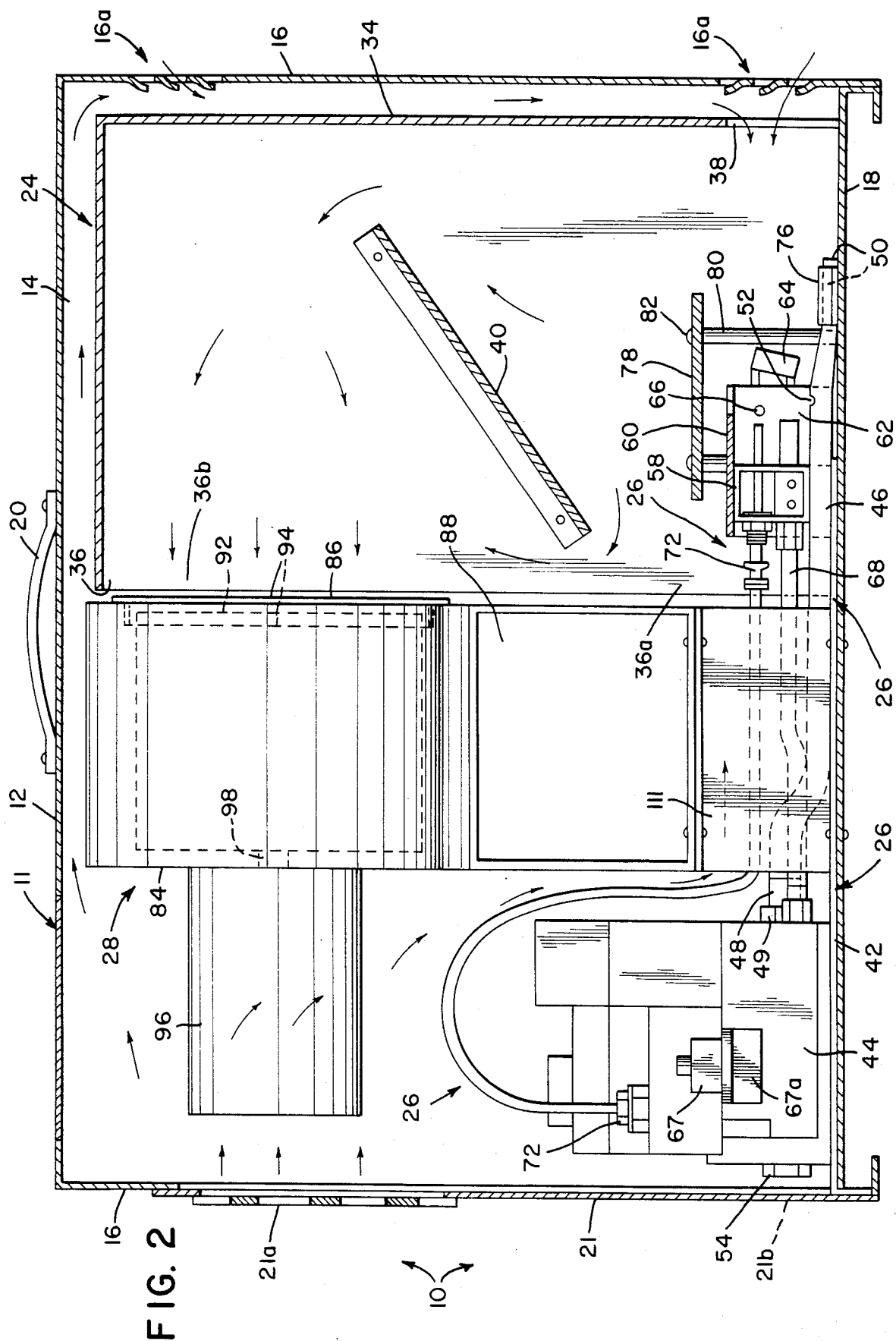
FIG. 2 is a cross-sectional view of the forced air heater shown in FIG. 1, in an assembled condition.

The combustion chamber 24 is of essentially box-shaped construction and includes a top wall 30, sidewalls 32, a back end wall 34 and an open front end 36, with a lower portion 36a (FIG. 2) of the open end defining an unheated ambient air-intake opening for the drawing of air into the combustion chamber and an upper portion 36b (FIG. 2) of the open end defining a heated air discharge opening. A lower end of the back end plate 34 also is spaced from the base plate 18 to define an unheated ambient air-intake rear opening 38. An inclined baffle plate 40 extends across the combustion chamber 24 between the sidewalls 32 to enhance the mixing of the combustion products and intake air prior to the resultant heated air entering the blower 28, and to help eliminate hot spots in the heater. The top wall 30, sidewalls 32, back end wall 36 and the baffle plate 40 are secured together and to the base plate 18, which forms a bottom wall of the combustion chamber, by suitable screws. The general flow of air through the heater 10, when the heater is in operation, is indicated by arrows in FIG. 2.

An important feature of the invention is the removable burner module 26, which includes an elongated support plate 42 having a fuel control valve 44 (the form shown being a combination gas burner-pilot light control valve) of a known type mounted thereon. The burner module 26 further includes an elongated burner tube 46 having an open end provided with a fitting 48 for connection of the burner tube to the control valve 44 by means of a threaded coupler 49, and having a closed flattened end 50. Between the open end fitting 48 and the closed flattened end 50, the elongated burner tube 46 is provided with a single burner orifice 52 in an upper sidewall of the tube, as viewed in FIGS. 1 and 2. The control valve 44 includes a control knob 53 and the valve is connected to a suitable fuel source (not shown), such as propane or natural gas, at a fitting 54 extending through a vertical slot 21b in the hinged access door 21. The control valve 44 can also be of the simple solenoid type (not shown).

The burner module 26 further includes an ignition source such as a pilot light device 58 shown with a pilot light windshield 60. The windshield 60 includes a "U" shaped channel 62 having a top wall and sidewalls, and a "U" shaped end deflector 64 at one end for more effective shielding of the pilot light device 58, with the opposite end of the shield being open such that the shield can be positioned over the pilot light device in straddling relationship thereto. The pilot light device 58 and the windshield 60 are mounted on suitably spaced brackets 65 on the support plate 42 by suitable screws (not shown).

The pilot light device 58 may be ignited by a piezoelectric ignitor system comprising an electrode 66 mounted on the pilot light windshield 60 and energized by a push button spark generator 67 mounted adjacent or on the gas valve 44 by a bracket 67a. As an alternative to the pilot light device 58, a direct spark device (not shown), such as a spark plug wired to be energized automatically when the heater 10 is plugged into an electrical source, may be utilized. A feed tube 68 for the pilot light device 58 extends therefrom to the control valve 44 and is suitably connected to the valve. A flame sensing device, such as a thermocouple 72, for maintaining the control valve 44 open when flame is present also is connected between the pilot light device 58 and the control valve in a known manner. Other types of flame sensing devices also may be used, such as a flame rod for a direct spark ignition system.

Associated with the removable burner module 26, for locating the elongated burner tube 46 in the heater 10, is a bracket 76 mounted on the base plate 18 adjacent a central portion thereof. The bracket 76 is of essentially inverted channel construction for receiving the flattened closed end 50 of the elongated burner tube 46, to locate the closed end of the burner tube, and thus the burner orifice 52 therein, in proper position in the heater 10.

More specifically, the locating-and-orienting bracket 76 locates the burner orifice 52 of the elongated burner tube 46 beneath and in opposed relationship to an essentially flat circular pancake flame-spreader plate 78 located above the orifice. The flame-spreader plate 78 is supported on the base plate 18 above the burner orifice 52 on vertical spacers 80 extending between the flame-spreader plate and the base plate. The flame-spreader plate 78 is secured to the base plate 18 by elongated vertical screws 82 extending through the flame-spreader plate 82, the spacers 80, the base plate 18, and affixed thereto by nuts (not shown).

The forced air blower 28, which is of a known type, includes a housing 84 having an open air-intake end 86 adjacent the upper end of the combustion chamber 24, and a discharge opening 88 which is aligned with a plurality of discharge openings 90 (FIG. 1) in one of the sidewalls 14 of the outer housing 11. The blower 28 further includes a blower wheel 92 within the housing 84, and an annular flanged air inlet ring 94 suitably mounted on the blower housing. The blower wheel 92 is located in the blower housing 84 adjacent the upper open end portion 36b of the combustion chamber 24 so as to draw heated air from the combustion chamber into the blower housing, and then discharge the heated air through the blower housing discharge opening 88 and the outer housing discharge openings 90 into the space to be heated. A blower drive motor 96 is supported on a closed end wall of the blower housing 84 on an opposite side thereof from the blower wheel 92, and includes a drive shaft 98 (FIG. 2) on which the blower wheel is supported.

The blower housing 84 is supported on the base plate 18 by a pair of spaced channel shaped mounting brackets 111 such that the housing straddles the burner module 26, to facilitate insertion of the burner module into the heater, removal of the burner module from the heater for servicing and flow of unheated ambient air beneath the housing into the lower open end portion 36a of the combustion chamber 24. In this connection, as is indicated by the arrows at the lefthand side of FIG. 2, the air-intake screen 21a is located such as to form an air flow-directing mechanism, whereby during operation of the heater 10, the blower device 28 causes relatively cool ambient air to be drawn into the outer housing 11 through the air-intake screen and upward and downward past the blower drive motor 96, prior to the air entering the combustion chamber, thereby simultaneously cooling the motor when the heater is in operation. Louvered air intake openings 16a in the rear end wall 16 of the housing 11 also are located to provide cooling air for the housing prior to the air entering the combustion chamber 24 through the air-intake opening 38 at the lower end of the back end plate 34.

To initiate operation of the heater 10, a valve on the above mentioned propane gas source (not shown) is turned to its fully opened position. The control knob 53 on the gas control valve 44 then is turned to a "pilot" position and the control knob is depressed to admit gas to the pilot light device 58. With the hinged door 21 on the housing 11 having been opened, the push button spark generator 67 is depressed several times causing sparks at the electrode 66, which light the pilot flame of the pilot light device 58. After the pilot light device 58 has become lit, the control knob 53 is kept depressed for approximately 30 seconds, and then released. When the pilot light device 58 remains lit, the control knob 53 on the control valve 44 is turned to an "on" position. The power cord 22 is then plugged into a suitable receptacle and the heater 10 begins to operate. With a direct spark ignition system, rather than a pilot light system, operation of the heater 10 is automatic when the heater is plugged into a suitable receptacle.

In summary, applicant has provided a new and improved forced-air type portable heater 10 which is of compact simplified construction, which is more readily serviceable than prior known devices, which achieves cleaner and more efficient combustion than prior known devices, and in which uniform mixing of combustion products and intake air is enhanced so as to eliminate hot spots in the heater. Particularly important is the removable burner module 26 in which all of the burner component parts, namely, the control valve 44, the elongated burner tube 46, the pilot light device 58, the pilot light windshield 60, the pilot light ignition system 66, 67, the pilot light feed tube 68 and the thermocouple 72, all are mounted on the elongated support plate 42, to facilitate mounting of the burner components in the heater, and to facilitate removal of the burner components from the heater for servicing outside of the heater. Further, the elongated burner tube 46 includes only the single burner orifice 52, which cooperates with the pancake flame-spreader plate 78, to provide a simple mechanism for producing effective combustion in the combustion chamber 24. Proper location and orientation of the elongated burner tube 46 in the heater 10 is accomplished by the flattened closed end 50 of the tube being received in the locating-and-orienting bracket 76 when the burner module 26 is positioned in the heater. The pilot light windshield 60, which straddles the pilot light device 58, provides effective shielding of the pilot light during heater operation. The box-shaped construction of the combustion chamber 24, with the inclined baffle plate 40 extending between the sidewalls 32 of the chamber, provides a construction which facilitates the uniform mixing of the combustion products and the intake air within the chamber, as noted above, prior to heated air being drawn from the combustion chamber into the blower housing 84 and being discharged therefrom. Further, the arrangement of air flow in the heater 10 is such that, as the blower device 28 draws relatively cool essentially unheated ambient air into the combustion chamber 24 through the lower open end portion 36a and the rear air-intake opening 38 thereof, the air initially flows past the blower drive motor 96, thereby simultaneously cooling the drive motor when the heater is in operation.

What is claimed is:

1. A forced air heater, which comprises:
   a base plate;
   a combustion chamber mounted on the base plate;
   a removable burner module for producing heated air in the combustion chamber;
   forced air blower means located adjacent the combustion chamber for drawing unheated air into the combustion chamber for heating, and for drawing heated air from the combustion chamber and exhausting the heated air into a space to be heated;
   an elongated burner tube forming part of the removable burner module, the elongated burner tube having opposite open and closed ends, and including a single burner orifice located in a sidewall of the tube between the open and closed ends and facing generally toward the forced air blower means;
   a flat flame-spreader plate located between the single burner orifice and the forced air blower means in opposed relationship to the single burner orifice;
   burner tube locating-and-orienting means mounted on the base plate, the locating-and-orienting means having an inverted essentially channel shaped configuration and the closed end of the burner tube having a flattened configuration and being receivable in the locating-and-orienting means;
   a blower drive motor forming part of the forced air blower means; and
   flow-directing means for causing the unheated air which is drawn into the combustion chamber to flow initially past the blower drive motor and thereby simultaneously cause cooling of the blower drive motor when the heater is in operation.

2. The forced air heater as recited in claim 1, which further comprises:
   a pilot light device adjacent the single orifice in the elongated burner tube for igniting fuel emanating from the orifice; and
   a windshield positioned over the pilot light device in straddling relationship thereto, the windshield having a top, opposed sidewalls and an air deflector at a downstream end.

3. The forced air heater as recited in claim 2, which further comprises:
   means for mounting the forced air blower means on the base plate in spaced relationship to the base plate so as to accommodate the removable burner module between the base plate and the forced air blower means with the removable burner module extending into the combustion chamber;
   a fuel flow control valve mounted on the support plate, with the elongated burner tube and the pilot light device being connected to the fuel flow control valve, and with the elongated burner tube, pilot light device and pilot light device windshield also being mounted on the elongated support member to form the removable burner module located between the base plate and the forced air blower means; and
   a thermocouple device connected between the pilot light device and the fuel flow control valve and forming part of the removable burner module.

4. The forced air heater as recited in claim 3, in which:
   the forced air blower means comprises a housing having an air-intake opening on one side thereof and having a discharge opening; and
   the combustion chamber is of essentially box-shaped construction and comprises a top, a bottom, opposed sidewalls, an end wall and an opposite essentially open end, a first portion of the housing open end defining an air-intake opening for the combustion chamber, and a second portion of the housing open end defining a heated air discharge opening for the combustion chamber and being located opposite the air-intake opening of the forced air blower means.

5. The forced air heater as claimed in claim 4, which further comprises:
   an inclined baffle plate mounted between the sidewalls of the combustion chamber between the single burner orifice and the air-intake opening of the forced air blower housing to enhance the mixing of combustion products and intake air within the combustion chamber.

6. A forced air heater, which comprises:
   a heater housing;
   a combustion chamber within the housing;
   a removable burner module in the housing and comprising a plurality of components, including a gas valve, an ignition means, an elongated burner tube having opposite open and closed ends and having a single burner orifice, and a single mounting means for supporting all of the components;

a flame spreader means within said combustion chamber adjacent the single orifice in the burner tube, the single orifice of the elongated burner tube being located in a sidewall of the tube between the open and closed ends of the tube and facing the flame spreader means;

burner tube locating-and-orienting means mounted on a wall of the combustion chamber, the locating-and-orienting means having an inverted essentially channel-shaped configuration and the closed end of the burner tube having a flattened configuration and being receivable in the locating-and-orienting means; and a forced air blower means located adjacent to the combustion chamber for drawing heated air out of the combustion chamber and exhausting the heated air into a space to be heated.

7. A forced air heater, which comprises, a base plate;

a heater housing supported on the base plate;

a combustion chamber within the housing;

a removable burner module in the housing and comprising a removable mounting plate means supported on the base plate, the burner module further comprising a plurality of components, including a gas valve, an ignition means and an elongated burner tube having a single burner orifice, said elongated burner tube having opposite open and closed ends, said single burner orifice of the elongated burner tube being located in a side-wall of the tube between the open and closed ends and facing the flame spreader means, all supported on the removable mounting plate means for removal from the housing with the mounting plate means as a unit;

a flame spreader means within said combustion chamber adjacent the single orifice in the burner tube;

a forced air blower means located adjacent to the combustion chamber for drawing heated air out of the combustion chamber and exhausting the heated air into a space to be heated; and burner tube locating-and-orienting means mounted on a wall of the combustion chamber, the locating means having an inverted essentially channel-shaped configuration and the closed end of the burner tube having a flattened configuration and being receivable in the locating-and-orienting means.

8. A forced air heater, which comprises, a base plate;

a heater housing supported on the base plate;

a combustion chamber within the housing;

a removable burner module in the housing and comprising a removable mounting plate means supported on the base plate, the burner module further comprising a plurality of components, including a gas valve, an ignition means and an elongated burner tube having a single burner orifice, said elongated burner tube having opposite open and closed ends, said single burner orifice of the elongated burner tube being located in a side-wall of the tube between the open and closed ends and facing the flame spreader means, all supported on the removable mounting plate means for removal from the housing with the mounting plate means as a unit;

a flame spreader means within said combustion chamber adjacent the single orifice in the burner tube;

a forced air blower means located adjacent to the combustion chamber for drawing heated air out of the combustion chamber and exhausting the heated air into a space to be heated; and burner tube locating-and-orienting means mounted on the base plate for receiving at least a portion of the closed end of the burner tube so as to locate and orient the single orifice in the sidewall of the tube into facing relationship to the flame spreader means.

* * * * *